United States Patent
Carrillo Pereira

(10) Patent No.: US 10,967,782 B2
(45) Date of Patent: Apr. 6, 2021

(54) TAILLIGHT ASSEMBLY

(71) Applicant: Nissan North America, Inc., Franklin, TN (US)

(72) Inventor: Mario Alberto Carrillo Pereira, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 135 days.

(21) Appl. No.: 16/429,962

(22) Filed: Jun. 3, 2019

(65) Prior Publication Data
US 2020/0377011 A1    Dec. 3, 2020

(51) Int. Cl.
*B60Q 1/30*    (2006.01)
*B62D 25/12*    (2006.01)

(52) U.S. Cl.
CPC .............. *B60Q 1/30* (2013.01); *B62D 25/12* (2013.01)

(58) Field of Classification Search
CPC ................................. B60Q 1/30; B62D 25/12
See application file for complete search history.

(56) References Cited

U.S. PATENT DOCUMENTS

2006/0227565 A1    10/2006    Nantais et al.

*Primary Examiner* — D Glenn Dayoan
*Assistant Examiner* — Melissa Ann Bonifazi
(74) *Attorney, Agent, or Firm* — Global IP Counselors, LLP

(57) ABSTRACT

A taillight assembly includes a lamp housing and a deformable member. The lamp housing is configured to be fixedly supported to a movable panel of a vehicle body structure. The lamp housing is positioned relative to an overhang of the movable panel such that the lamp housing and the overhang are separated by a space. The deformable member is attached to the lamp housing and disposed within the space. The deformable member has a first exposed surface that substantially aligns with a second exposed surface of the lamp housing and a third exposed surface of the overhang.

20 Claims, 5 Drawing Sheets

TAILLIGHT ASSEMBLY

BACKGROUND

Field of the Invention

The present invention generally relates to a taillight assembly. More specifically, the present invention relates to taillight assembly having a deformable member.

Background Information

Most vehicles typically include various lamp assemblies for illuminating exterior areas about the vehicle. For example, most vehicles have a pair of vehicle headlamp assemblies disposed in a front area of the vehicle and a pair of vehicle taillight assemblies disposed in a rear area of the vehicle. Vehicle lamp assemblies typically function as parking lamps, daytime running lamps, fog lights, off-road utility lights as well as various other signaling devices. In addition to providing light, taillight assemblies can also be decorative with respect to the vehicle. Many modern automotive vehicle lamp assemblies have begun using light emitting diodes (LEDs) as a form of lighting device. In the case of vehicle taillight assemblies, it has also been increasingly popular to mount the vehicle taillight assemblies onto a movable panel of a vehicle, such as a trunk lid or a rear door.

SUMMARY

In view of the state of the known technology, one aspect of the present disclosure is to provide a taillight assembly comprising a lamp housing and a deformable member. The lamp housing is configured to be fixedly supported to a movable panel of a vehicle body structure. The lamp housing is positioned relative to an overhang of the movable panel such that the lamp housing and the overhang are separated by a space. The deformable member is attached to the lamp housing and is disposed within the space. The deformable member has a first exposed surface that substantially aligns with a second exposed surface of the lamp housing and a third exposed surface of the overhang.

In view of the state of the known technology, another aspect of the present disclosure is to provide a vehicle having a taillight assembly comprising a vehicle body structure, a lamp housing and a deformable member. The vehicle body structure includes a movable panel movable to cover a storage access opening. The movable panel has an overhang protruding over a taillight installation area of the movable panel. The lamp housing is fixedly supported to the movable panel at the taillight installation area. The lamp housing is positioned relative to the overhang such that the lamp housing and the overhang are separated by a space. The deformable member is attached to the lamp housing and is disposed within the space. The deformable member has a first exposed surface that substantially aligns with a second exposed surface of the lamp housing and a third exposed surface of the overhang.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
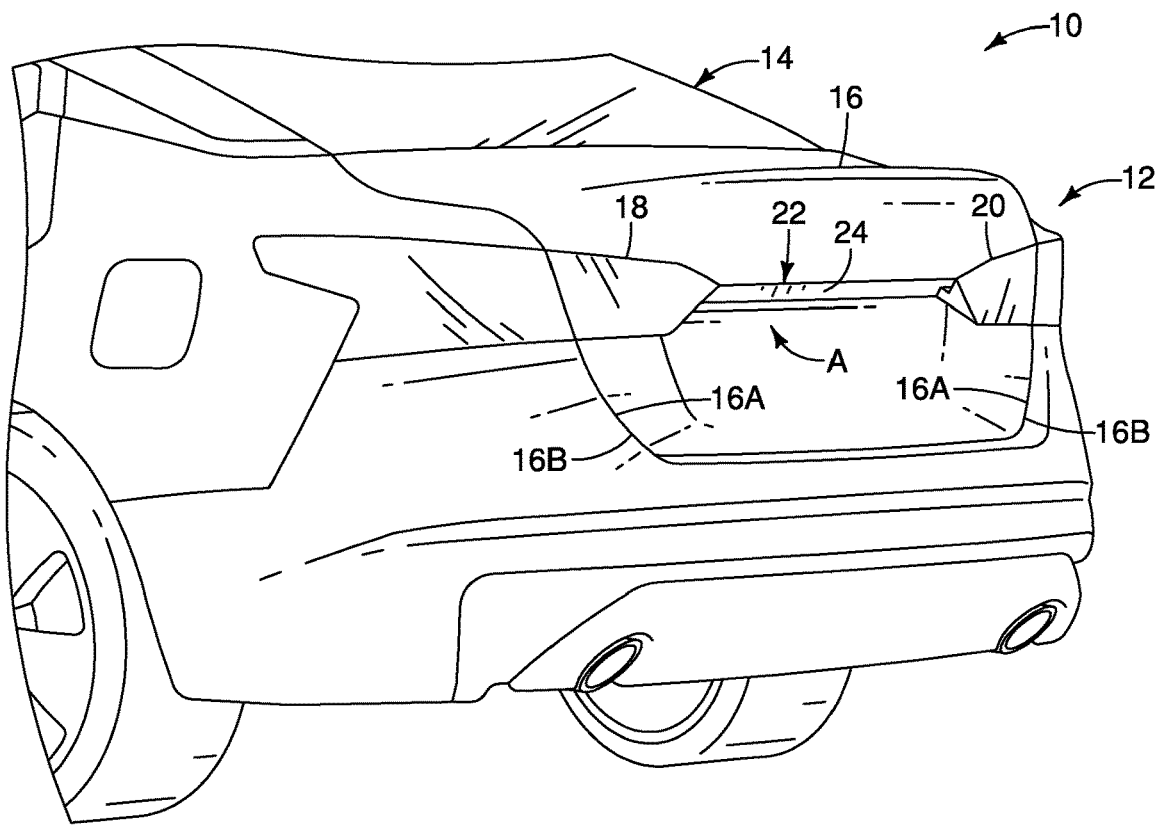
FIG. 1 is a perspective view of a rear portion of a vehicle equipped with a taillight assembly in accordance with the illustrated embodiment.

Referring initially to FIG. 1, a portion of a vehicle 10 equipped with a vehicle light structure 12 is illustrated in accordance with an embodiment. In particular, the vehicle 10 has a vehicle body structure 14 that includes a movable panel 16 movable to cover a storage access opening (e.g., a rear trunk or compartment) of the vehicle 10. The movable panel 16 supports a first taillight assembly 18 and a second taillight assembly 20 of the vehicle light structure 12. The vehicle body structure 14 is a conventional structure that is configured to accommodate the first and second taillight assemblies 18 and 20. In the illustrated embodiment, the vehicle body structure 14 can be made of one or more body panels to form a unibody construction. Alternatively, the vehicle body structure 14 can be a body that is mounted on a frame. It will be apparent to those skilled in the vehicle field from this disclosure that the vehicle light structure 12 can be implemented with vehicles of many different sizes, designs and constructions.

The vehicle body structure 14 has at least one stationary body panel that at least partially defines the access opening for accessing the rear compartment of the vehicle 10. The movable panel 16 is a closure member that is movably mounted with respect to a rear bumper. The movable panel 16 is capable of moving between a closed position (FIG. 1) and an open position (not shown). In the illustrated embodiment, the movable panel 16 is a rear hatch. Therefore, the movable panel 16 is hinged to selectively close and open the access opening in a conventional manner. In the illustrated embodiment, the movable panel 16 has a pair of peripheral edges 16A that each align with a corresponding peripheral edge 16B of the access opening.

The first and second taillight assemblies 18 and 20 are installed substantially at or adjacent to the peripheral edges 16A of the movable panel 16. The first taillight assembly 18 is installed at a left rear corner of the movable panel 16 and the second taillight assembly 20 is attached at a right rear corner of the movable panel 16. In the illustrated embodiment, the first taillight assembly 18 and the second taillight assembly 20 are examples of rear position lamps of the vehicle 10. In this way, the first and second taillight assemblies 18 and 20 can be wired to emit red light and can be wired to be lit whenever the front position lamps are lit, including when the headlamps are on. The first taillight assembly 18 and the second taillight assembly 20 can be combined with the vehicle's 10 stop lamps to perform stop-lamp function(s) and/or combined with the vehicle's 10 dimmer red light to perform rear positioning lamp function (s). Additionally, the first taillight assembly 18 and the second taillight assembly 20 can function as backup lamps and perform reverse functions to alert other vehicles and/or pedestrians in the vehicle's 10 vicinity that the vehicle 10 is moving in reverse.

Figure 2:
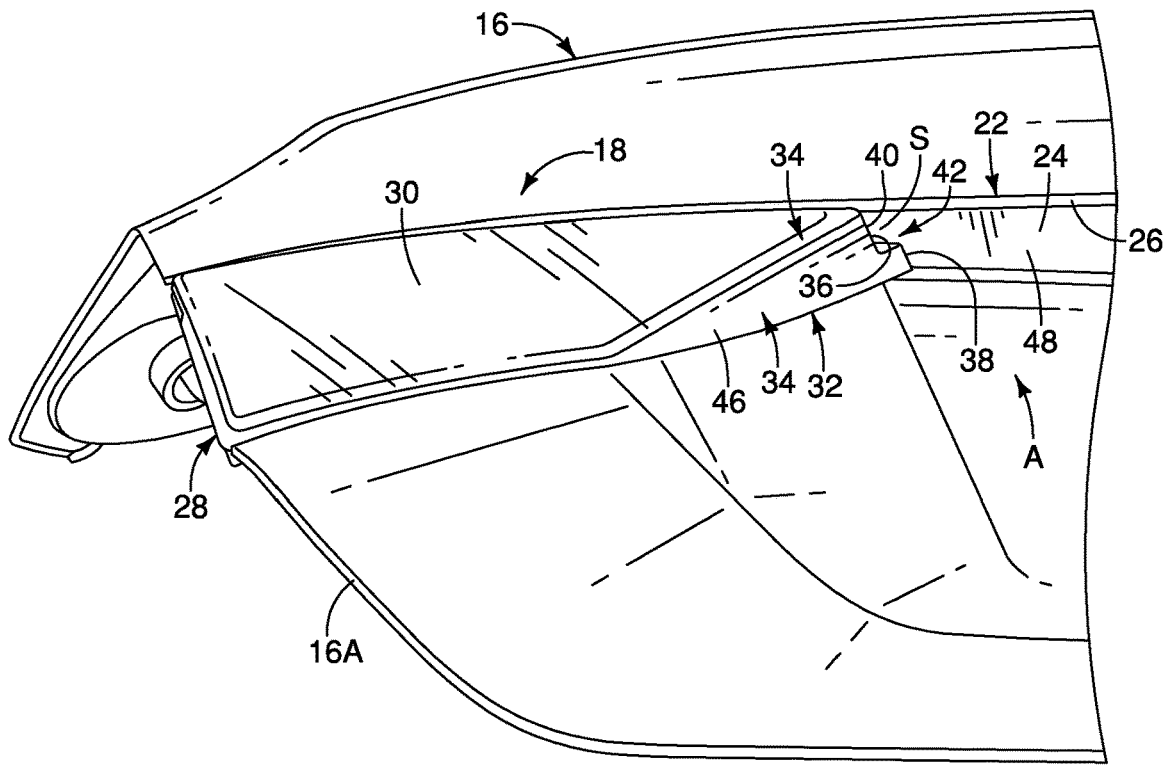
FIG. 2 is an enlarged perspective view of the taillight assembly of FIG. 1, the taillight assembly being disposed adjacent to an overhang of a movable panel of the vehicle.
Figure 3:
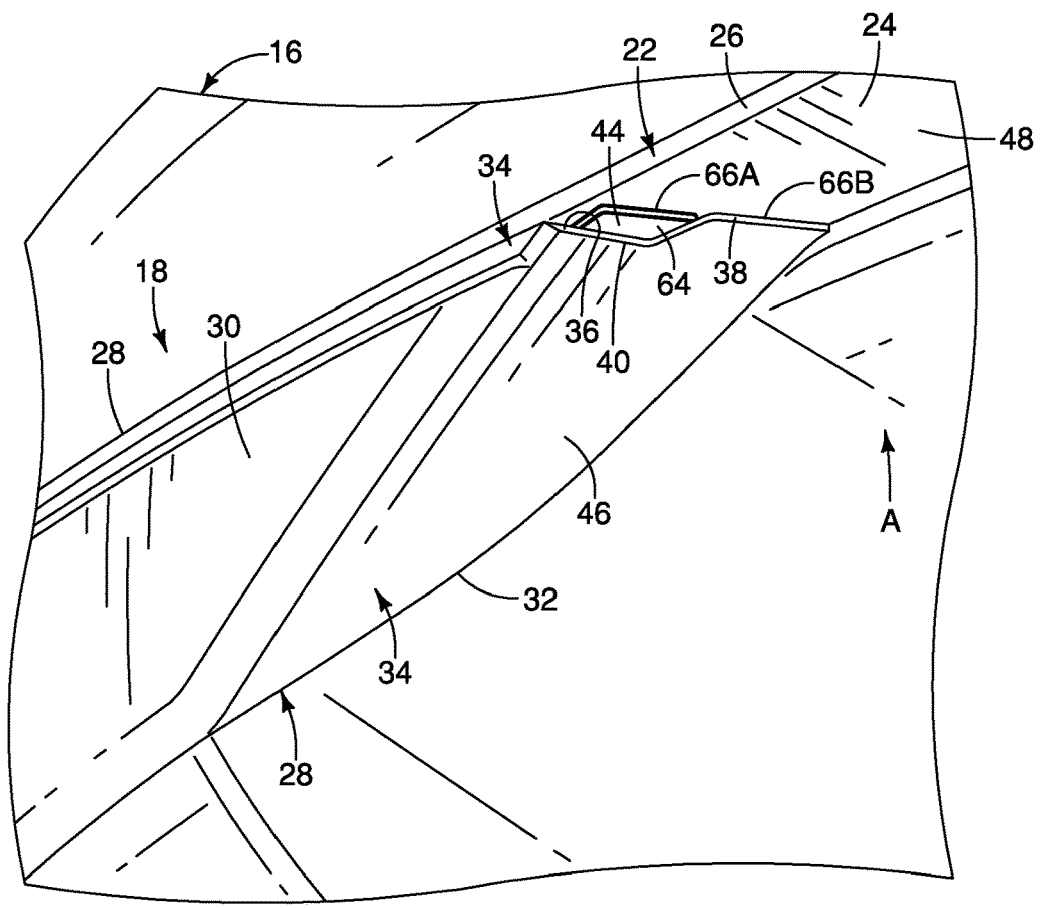
FIG. 3 is an enlarged perspective view of a lamp housing of the taillight assembly equipped with a deformable member.

As shown, the first and second taillight assemblies 18 and 20 are disposed on lateral sides of the movable panel 16. As best seen in FIGS. 1 to 3, the movable panel 16 includes an overhang 22 that extends laterally between the first and second taillight assemblies 18 and 20 across the movable panel 16. The overhang 22 protrudes over a taillight installation area A of the movable panel 16. The taillight installation area A includes a pair of cavities C (only one shown in FIGS. 5 and 6 of the illustrated embodiment) in the movable panel 16, each sized and dimensioned for receiving one of the first and second taillight assemblies 18 and 20. The first and second taillight assemblies 18 and 20 are fixedly supported to the movable panel 16 at the taillight installation area A and adjacent to the overhang 22.

Figure 4:
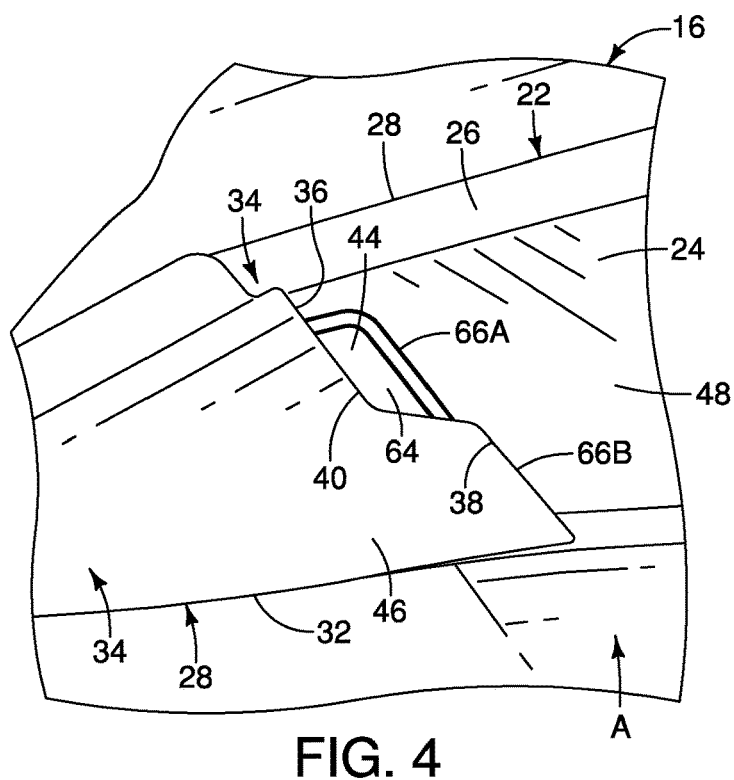
FIG. 4 is an enlarged view of FIG. 3.
Figure 5:
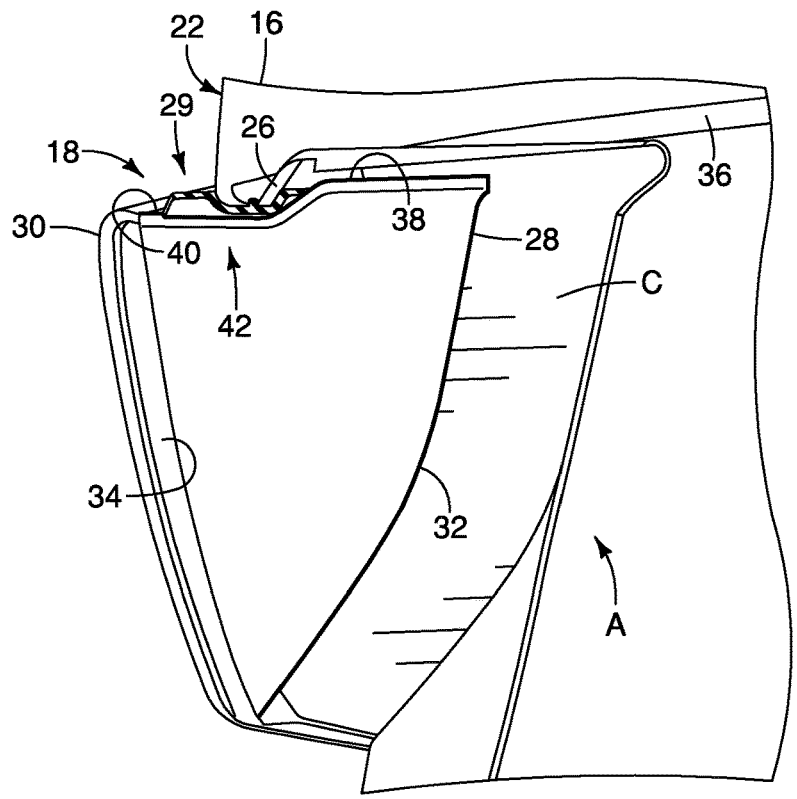
FIG. 5 is a cross-sectional view of the taillight assembly in the process of being installed to the vehicle.
Figure 6:
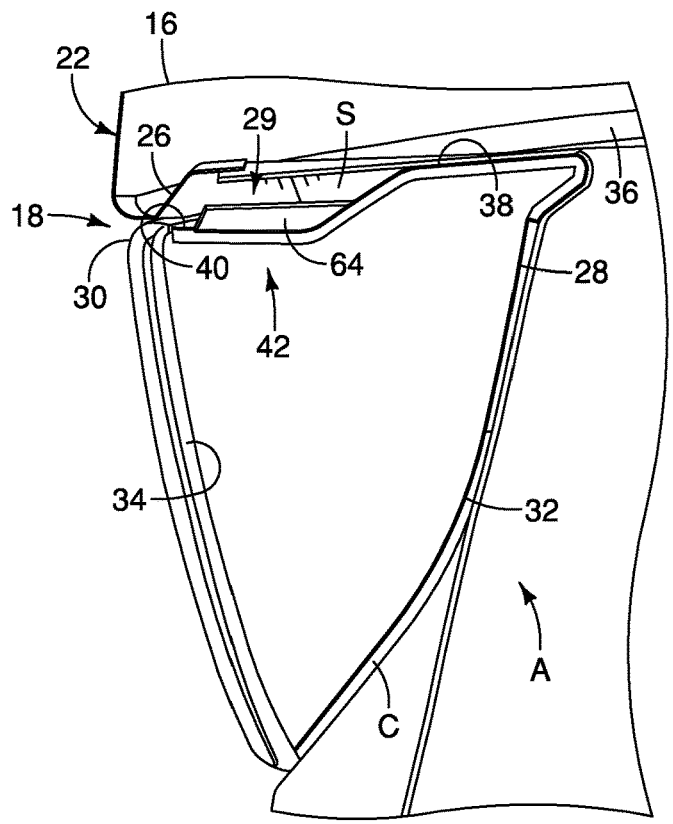
FIG. 6 is a cross-sectional view similar to FIG. 5 with the taillight assembly fully installed to the vehicle.

As best seen in FIGS. 2 to 4, the overhang 22 includes a taillight facing surface 24 that abuts the first and second taillight assemblies 18 and 20 when the first and second taillight assemblies 18 and 20 are attached to the movable panel 16. In the illustrated embodiment, the taillight facing surface 24 is an exposed surface of the overhang 22. As seen in FIGS. 5 and 6, the overhang 22 includes a downward sloping lip 26 that protrudes from the exposed surface 48 of the overhang 22 towards the taillight installation area A.

In the illustrated embodiment, the first taillight assembly 18 and the second taillight assembly 20 are shown with specific contours and shapes. However, it will be apparent to those skilled in the vehicle field from this disclosure that the depicted overall design and shapes of the first taillight assembly 18 and the second taillight assembly 20 are merely illustrative examples of such structures. It will be apparent to those skilled in the vehicle field from this disclosure that the first and second taillight assemblies 18 and 20 are not limited to the depicted design(s). In other words, the claimed invention can be implemented using taillight assemblies having differing shapes, sizes and contours. Also, in the illustrated embodiment, the first taillight assembly 18 and the second taillight assembly 20 are functionally and structurally identical except for being mirror images of one another. As the first taillight assembly 18 and the second taillight assembly 20 are basically identical, only the first taillight assembly 18 will be further described below for brevity. Therefore, the first taillight assembly 18 will be hereinafter referred to simply as "the taillight assembly 18." The taillight assembly 18 comprises a lamp housing 28 and a deformable member 29, as will be further discussed below.

Referring to FIG. 2, the lamp housing 28 is fixedly supported to the movable panel 16 at the taillight installation area A. The lamp housing 28 that is positioned relative to the overhang 22 of the movable panel 16 such that the lamp housing 28 and the overhang 22 are separated by a space S. The taillight assembly 18 further includes a transparent outer lens cover 30. Although not shown, the taillight assembly 18 can also include a bezel member, a light emitting member, and a transparent inner lens cover and an inner frame member, as is conventional. These structures have been removed in the illustrated embodiment for simplicity of understanding the claimed invention. The transparent outer lens cover 30, the transparent inner lens cover and the inner frame member are configured to complement the shapes and overall designs of the lamp housing 28. However, it will be apparent to those skilled in the vehicle field from this disclosure that these components of the taillight assembly 18 are not limited to the illustrated shape or design. Further, while the taillight assembly 18 is illustrated as being implemented with the movable panel 16, it will be apparent to those skilled in the vehicle field that the taillight assembly 18 can be sized and dimensioned to be implemented with other panels of the vehicle body structure 14.

Figure 7:
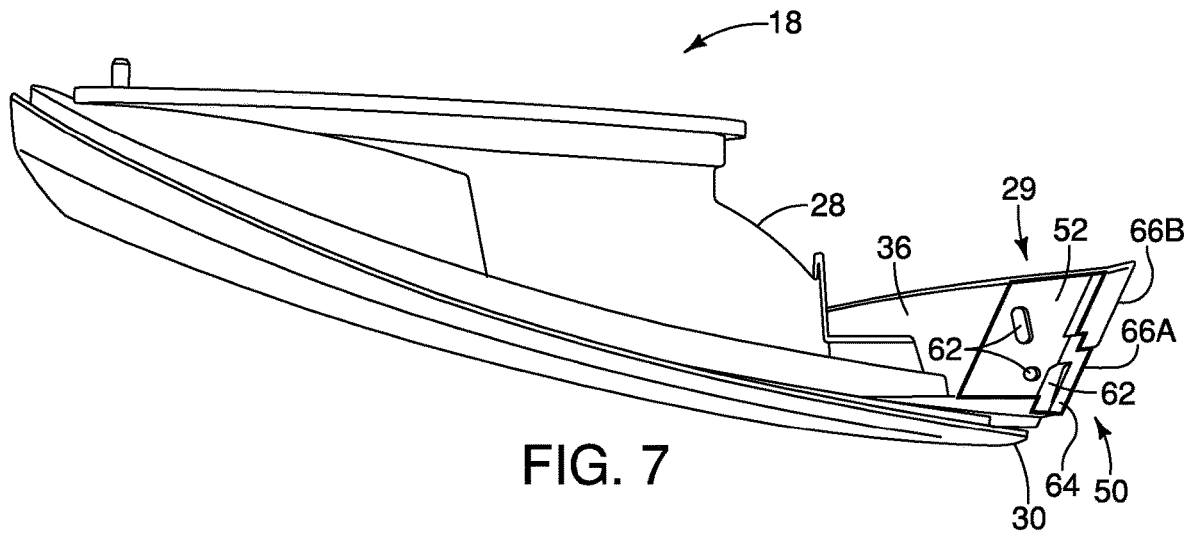
FIG. 7 is a top plan view of the taillight assembly having the deformable member.
Figure 8:
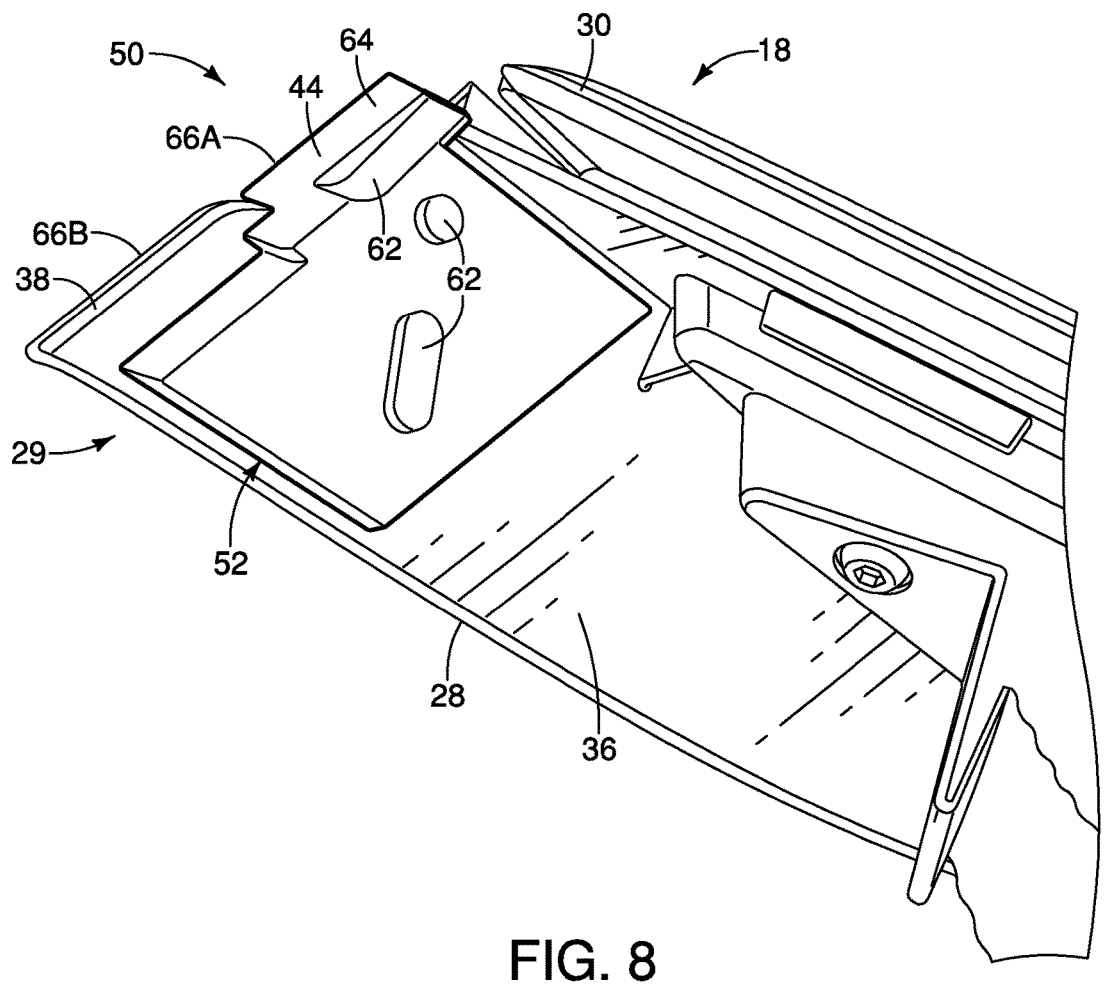
FIG. 8 is an enlarged view of FIG. 7 showing the deformable member.

As best seen in FIGS. 5 and 6, the lamp housing 28 includes a front facing side 32 and a rear facing side 34. The lamp housing 28 further includes an overhang facing side 36. The front facing side 32 faces in the direction of the vehicle interior and towards the cavity C of the taillight installation area A. The rear facing side 34 faces the outer lens cover 30. The overhang facing side 36 faces the taillight facing surface 24 of the overhang 22. As seen in FIGS. 2 to 4 and 7, the overhang facing side 36 of the lamp housing 28 is a stepped surface. The stepped surface includes an overhang abutting part 38 and a stepped part 40 that is indented with respect to the overhang abutting part 38. The stepped part 40 is spaced from the overhang 22, as seen in FIGS. 3 to 5. The overhang abutting part 38 and the stepped part 40 define a cutout 42 of the lamp housing 28. Therefore, as best seen in FIGS. 6 to 8, the lamp housing 28 includes the cutout 42 that is formed on the overhang facing side 36. Alternatively speaking, the cutout 42 is defined by the contours of the lamp housing 28 (e.g., the overhang abutting part 38 and the stepped part 40).

The overhang 22 and cutout 42 are separated by the space S when the taillight assembly is installed onto the movable panel 16. The space S receives the downward lip 26 of the overhang 22 during installation of the taillight assembly to the movable panel 16, as shown in FIG. 5. Alternatively speaking, the lip 26 of the overhang 22 is received in the stepped part 40 of the lamp housing 28 during installation of the taillight to the movable panel 16. The cutout 42 is therefore dimensioned to receive the lip 26 of the overhang 22 to prevent damage to the overhang 22 and the lamp housing 28 during installation of the lamp to the cavity C of the movable panel 16. The lip 26 passes through the cutout 42 as seen in FIG. 5, and extends rearward of the stepped part 40 when the lamp housing 28 is installed onto the movable panel 16, as seen in FIG. 6.

The deformable member 29 is disposed in the space S to form a flush surface between the lamp housing 28 and the overhang 22, as best seen in FIGS. 3 and 4. In particular, the deformable member 29 has an exposed surface 44 that forms a flush surface between an exposed surface 46 of the lamp housing 28 and the exposed surface 48 (e.g., the taillight facing surface 24) of the overhang 22. In other words, the deformable member 29 has the exposed surface 44 that substantially aligns with the exposed surface 46 of the lamp housing 28 and the exposed surface 48 of the overhang 22.

In the illustrated embodiment, the exposed surface 44 of the deformable member 29 is considered a first exposed surface 44 of the taillight assembly 18. The exposed surface 46 of the lamp housing 28 is considered a second exposed surface 46 of the taillight assembly 18. The exposed surface 48 of the overhang 22 is considered a third exposed surface 48 of the taillight assembly. The space S separating the lamp housing 28 and the overhang 22 is defined by the stepped part 40 and the third exposed surface 48 of the overhang 22. The deformable member 29 is attached to the stepped part 40 of the lamp housing 28. In this way, the deformable member 29 is disposed in the space S to prevent damage to the lamp housing 28 during installation of the taillight assembly 18 to the movable panel 16. The deformable member 29 is operatively disposed in the cutout 42 to cover the space S so that the lamp housing 28 does not appear to be separated from the overhang 22 by the space S.

In the illustrated embodiment, the deformable member 29 is configured and arranged to form a buffer or interface the lamp housing 28 and the movable panel 16. The deformable member 29 is preferably made of synthetic resin(s) having a lower rigidity than the movable panel 16 so that the deformable member 29 can deform or compress when making contact with the lip 26 of the overhang 22 during installation. The deformable member 29 is resilient so that the deformable member 29 substantially retains and reverts to its original shape and size after the taillight assembly 18 has been installed. The deformable member 29 preferably also has a lower rigidity than the lamp housing 28. Preferably, the deformable member 29 is at least partially made of rubber.

Figure 9:
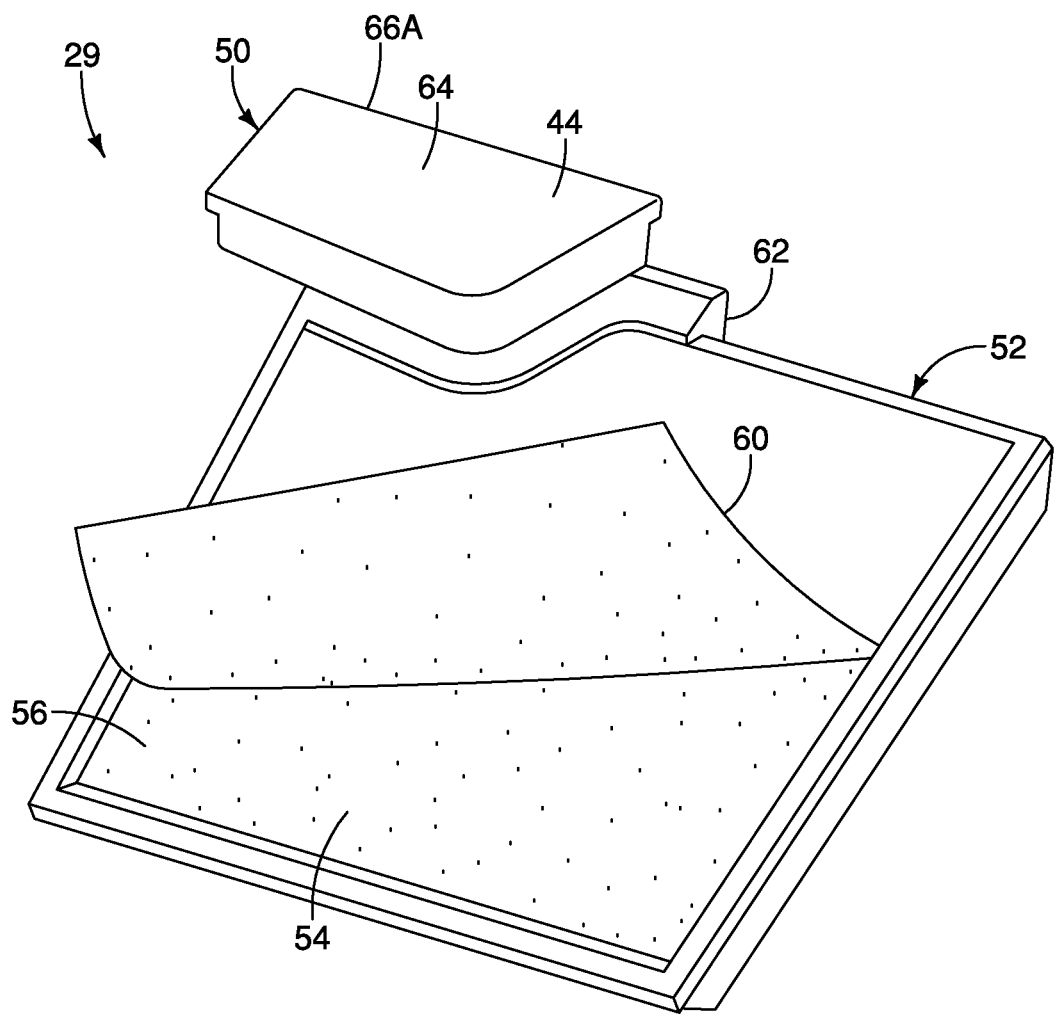
FIG. 9 is a plan view of the deformable member.

Referring to FIGS. 8 and 9, the deformable member 29 includes an exposed part 50 and an attachment part 52. The exposed part 50 has the first exposed surface 44 of the deformable member 29 that forms the flush surface with the second and third exposed surfaces 46 and 48. The deformable member 29 is attached to the lamp housing 28 at the attachment part 52. In particular, the attachment part 52 of the deformable member 29 is attached to the stepped part 40 of the lamp housing 28. The attachment part 52 extends from the exposed part 50 and is configured to be fixedly attached to the overhang facing side 36 of the lamp housing 28. Preferably, the exposed part 50 and the attachment part 52 are formed as a one-piece, unitary member. However, it will be apparent to those skilled in the vehicle field from this disclosure that the exposed part 50 and the attachment part 52 can be formed as separate members that are coupled or integrated with each other.

As seen in FIG. 9, the attachment part 52 includes an attaching surface 54 configured to be fixedly attached to the overhang facing side 36 of the lamp housing 28 of the taillight. Preferably, the attaching surface 54 of the deformable member 29 includes adhesive 54 for attaching the deformable member 29 to the lamp housing 28. More preferably, in the illustrated embodiment, the attachment part 52 includes double-sided tape 58. That is, the attachment part 52 includes a detachable sheet 60 that can be removed to expose the adhesive 54 for attaching the deformable member 29 to the lamp housing 28. It will be apparent to those skilled in the vehicle field from this disclosure that the attachment part 52 can be configured to include alternative attachment mechanisms, such as clip 26s, fasteners, etc.

The attachment part 52 includes the overhang facing side 36 of the deformable member 29 that is opposite of the attaching surface 54. As best seen in FIG. 8, the overhang facing side 36 of the deformable member 29 includes at least one positioning abutment 62. As shown, the deformable member 29 includes a plurality of positioning abutments 62. The positioning abutments 62 are designed and configured to abut the overhang 22 of the movable panel 16 when the lamp housing 28 is installed onto the movable panel 16. In the illustrated embodiment, three positioning abutments 62 are shown that are configured to contact contouring surfaces of the taillight facing surface 24 of the overhang 22. It will be apparent to those skilled in the vehicle field from this disclosure that the deformable member 29 can include additional or fewer positioning abutments 62 or other positioning mechanisms to position the deformable member 29 on the lamp housing 28.

Referring to FIGS. 3 to 5, 8 and 9, the exposed part 50 of the deformable member 29 includes a protrusion 64 protruding from the attachment part 52. The protrusion 64 is sized and dimensioned to substantially correspond to a size and dimension of the space S between the lamp housing 28 and the overhang 22. In particular, the protrusion 64 has an exposed edge 66A that substantially aligns with an exposed edge of the lamp housing 28. The exposed edge 66A is part of the first exposed surface 44 of the deformable member 29, as seen in FIGS. 3 and 4. The exposed edge 66B of the lamp housing 28 contacts the overhang 22 of the movable panel 16 when the lamp housing 28 is installed onto the movable panel 16. The protrusion 64 protrudes from the attachment part 52 towards the overhang 22 when the lamp housing 28 is installed onto the movable panel 16. In this way, the protrusion 64 covers the space S. As the protrusion 64 extends into the space S between the lamp housing 28 and the overhang 22, at least the protrusion 64 is preferably made of rubber to deform during installation of the taillight assembly 18 to the movable panel 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the taillight assembly. Accordingly, these terms, as utilized to describe the present invention should be interpreted relative to a vehicle equipped with the taillight assembly.

The term "configured" as used herein to describe a component, section or part of a device includes hardware and/or software that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A taillight assembly comprising:
a lamp housing configured to be fixedly supported to a movable panel of a vehicle body structure, the lamp housing being positioned relative to an overhang of the movable panel such that the lamp housing and the overhang are separated by a space; and
a deformable member attached to the lamp housing and disposed within the space, the deformable member having a first exposed surface that substantially aligns with a second exposed surface of the lamp housing and a third exposed surface of the overhang.

2. The taillight assembly according to claim 1, wherein the deformable member includes an exposed part and an attachment part, the exposed part having the exposed surface, the attachment part extending from the exposed part and configured to be fixedly attached to an overhang facing side of the lamp housing.

3. The taillight assembly according to claim 2, wherein the overhang facing side of the lamp housing is a stepped surface having an overhang abutting part and a stepped part that is spaced from the overhang, the deformable member being attached to the stepped part.

4. The taillight assembly according to claim 2, wherein the attachment part includes an attaching surface configured to be fixedly attached to the overhang facing side of the lamp housing.

5. The taillight assembly according to claim 2, wherein the exposed part of the deformable member includes a protrusion protruding from the attachment part toward the overhang when the lamp housing is installed onto the movable panel.

6. The taillight assembly according to claim 5, wherein the protrusion is sized and dimensioned to substantially correspond to a size and dimension of the space between the lamp housing and the overhang.

7. The taillight assembly according to claim 5, wherein the protrusion is made of rubber to deform during installation of the lamp housing to the movable panel.

8. The taillight assembly according to claim 3, wherein the protrusion has an exposed edge that substantially aligns with an exposed edge of the lamp housing, the exposed edge of the lamp housing contacting the overhang of the movable panel when the lamp housing is installed onto the movable panel.

9. The taillight assembly according to claim 3, wherein the attaching part includes an overhang facing side of the deformable member that is opposite of the attaching surface, the overhang facing side of the deformable member includes at least one positioning abutment configured to abut the overhang of the movable panel when the lamp housing is installed onto the movable panel.

10. The taillight assembly according to claim 4, wherein the attaching surface of the deformable member includes adhesive.

11. The taillight assembly according to claim 2, wherein the attachment part includes double-sided tape.

12. A vehicle having a taillight assembly comprising:
a vehicle body structure including a movable panel movable to cover a storage access opening, the movable panel having an overhang protruding over a taillight installation area of the movable panel;
a lamp housing fixedly supported to the movable panel at the taillight installation area, the lamp housing being positioned relative to the overhang such that the lamp housing and the overhang are separated by a space; and
a deformable member attached to the lamp housing and disposed within the space, the deformable member having a first exposed surface that substantially aligns with a second exposed surface of the lamp housing and a third exposed surface of the overhang.

13. The vehicle according to claim 12, wherein the deformable member includes an exposed part and an attachment part, the exposed part having the exposed surface, the attachment part extending from the exposed part and being fixedly attached to an overhang facing side of the lamp housing.

14. The vehicle according to claim 13, wherein the overhang facing side of the lamp housing is a stepped surface having an overhang abutting part and a stepped part that is spaced from the overhang, the attachment part of the deformable member being attached to the stepped part of the lamp housing.

15. The vehicle according to claim 14, wherein the overhang includes a downward sloping lip that protrudes from the third exposed surface toward the taillight installation area, the lip being received in the stepped part of the lamp housing during installation of the lamp housing to the movable panel.

16. The vehicle according to claim 15, wherein the lip extending rearward of the stepped part when the lamp housing is installed onto the movable panel.

17. The vehicle according to claim 15, wherein the space is defined by the stepped part and the third exposed surface of the overhang.

18. The vehicle according to claim 13, wherein the exposed part of the deformable member includes a protrusion protruding from the attachment part toward the overhang.

19. The vehicle according to claim 18, wherein the protrusion is sized and dimensioned to substantially correspond to a size and dimension of the space between the lamp housing and the overhang.

20. The taillight assembly according to claim 19, wherein the protrusion is made of rubber to deform during installation of the taillight assembly to the movable panel.

* * * * *